(12) United States Patent
Marisamy et al.

(10) Patent No.: US 8,578,111 B2
(45) Date of Patent: Nov. 5, 2013

(54) BACKUP OPTIMIZATION POLICY TABLE FOR CONTROLLING BUFFERED/UN-BUFFERED INPUT/OUTPUT

(75) Inventors: Venkatesh Marisamy, Tamilnadu (IN); Kanthimathi Vedaraman, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 252 days.

(21) Appl. No.: 13/270,360

(22) Filed: Oct. 11, 2011

(65) Prior Publication Data

US 2013/0091333 A1 Apr. 11, 2013

(51) Int. Cl.
*G06F 12/00* (2006.01)
*G06F 3/00* (2006.01)
*G06F 13/00* (2006.01)

(52) U.S. Cl.
USPC ........... 711/162; 711/138; 711/154; 711/165; 710/52

(58) Field of Classification Search
USPC ............ 711/138, 154, 161, 162, 165; 710/15, 710/17, 18, 39, 52
See application file for complete search history.

(56) References Cited

U.S. PATENT DOCUMENTS

| | | | |
|---|---|---|---|
| 7,197,577 B2 | 3/2007 | Nellitheertha | |
| 7,380,067 B2 * | 5/2008 | Schnapp et al. | 711/138 |
| 7,457,893 B2 | 11/2008 | Gallgher et al. | |
| 7,805,706 B1 | 9/2010 | Ly et al. | |
| 7,925,622 B2 | 4/2011 | Chapman | |
| 8,140,860 B2 * | 3/2012 | Haswell | 713/193 |
| 8,327,078 B2 * | 12/2012 | Berger et al. | 711/138 |
| 2003/0126372 A1 * | 7/2003 | Rand | 711/141 |
| 2004/0117441 A1 * | 6/2004 | Liu et al. | 709/203 |
| 2009/0182969 A1 | 7/2009 | Norgaard et al. | |
| 2009/0327798 A1 * | 12/2009 | D'Amato et al. | 714/4 |
| 2012/0072675 A1 * | 3/2012 | Moyer | 711/138 |

* cited by examiner

*Primary Examiner* — John Lane
(74) *Attorney, Agent, or Firm* — M. Aamir Haq (57) ABSTRACT

A device includes a data collector module, a policy module, and an optimizer module. The data collector module is to collect values for a plurality of device parameters. The policy module is to receive the values for the plurality of device parameters and update a policy table. The optimizer module is to receive the policy table from the policy module, determine, based on the policy table, whether to proceed with buffered input/output or un-buffered input/output for a read call, and instruct a read module of a backup application to proceed with either buffered input/output or un-buffered input/output for the read call.

15 Claims, 4 Drawing Sheets

Fig. 1

| Parameter | Value |
| --- | --- |
| File System Type | Veritas File System (VxFS) |
| Used File System Capacity | 4 GB |
| Overall File System Capacity | 6 GB |
| File System Utilization | 66.66 % |
| Database Volume | 2 GB |
| Memory Utilization | 40 % |
| CPU Utilization | 20 % |
| Cache Misses | 80 % |
| Maximum I/O Size | 1 MB |

BACKUP OPTIMIZATION POLICY TABLE FOR CONTROLLING BUFFERED/UN-BUFFERED INPUT/OUTPUT

BACKGROUND

Modern computer systems are used to store, process, and communicate vast amounts of valuable information. The information is stored either locally or in a distributed manner, and is often backed up periodically or continuously to provide protection in the event of, e.g., a power outage, a virus, a natural disaster, or another event that temporarily or permanently disrupts the computer system and/or the associated network.

Backup processes are typically conducted by a backup application. The backup application makes periodic copies of data which may be used to restore original data in the event of a data loss. The amount of time to conduct a backup process is generally dependent on a number of factors, including the type of backup process (e.g., online backup, raw data backup, file system backup, snapshot backup, etc.), the type of input/output (I/O) (e.g., buffered I/O or un-buffered I/O), system properties (e.g., speed, memory size, etc.) and/or the amount of data to be processed.

BRIEF DESCRIPTION OF THE DRAWINGS

Certain exemplary embodiments are described in the following detailed description and in reference to the drawings, in which.

DETAILED DESCRIPTION

Disclosed are embodiments for optimizing a backup process. More specifically, disclosed are embodiments for dynamically deciding between buffered I/O and un-buffered I/O based on detected system conditions. These embodiments allow for optimum I/O performance by overcoming inefficiencies caused by system designers making static decisions between buffered I/O and un-buffered I/O at the system design phase. That is, the present techniques may reduce poor performance caused by fixed decisions to use buffered I/O in all instances, even though un-buffered I/O may provide better performance under some conditions. Similarly, the present techniques may reduce poor performance caused by fixed decisions to use un-buffered I/O in all instances, even though buffered I/O may provide better performance under certain conditions. Embodiments implement a real-time or on-the-fly decision making ability to take advantage of buffered I/O or un-buffered I/O when such an I/O technique would be optimum for a given instance based on detected system conditions. As described in further detail below, embodiments may utilize a novel and unforeseen performance optimization tool comprising a data collector module, a policy module, and an optimizer module to collaborate with a reader module of a backup application to effectuate this optimization.

In one embodiment, a method for backup optimization is provided. The method may comprise collecting, by a data collector module of a host device, values for a plurality of device parameters. A policy module may receive these values from the data collector module and update a policy table with the values for the plurality of device parameters. An optimizer module may then receive the policy table and determine whether to proceed with buffered input/output or un-buffered input/output for a read call based at least in part on the policy table. The optimizer module may then instruct a read module of a backup application to proceed with either buffered input/output or un-buffered input/output for the read call.

In another embodiment, a system is provided. The system may comprise one or more memories and one or more processors communicatively coupled to the one or more memories. The one or more memories may store instructions that when executed by the one or more processors implement operations comprising collecting values for a plurality of device parameters; receiving the values for the plurality of device parameters and updating a policy table; determining, based on the policy table, whether to proceed with buffered input/output or un-buffered input/output for a read call; and providing instructions to proceed with either buffered input/output or un-buffered input/output for the read call.

In a further embodiment, a processor-readable storage medium having processor-executable instructions stored thereon is provided. The processor-executable instructions, when executed, may cause a processor conduct to: collect values for a plurality of device parameters; update a policy table with the values for the plurality of device parameters; determine, based at least in part on the policy table, whether to proceed with buffered input/output or un-buffered input/output for a read call; and send an instruction to proceed with either buffered input/output or un-buffered input/output for the read call.

Figure 1:
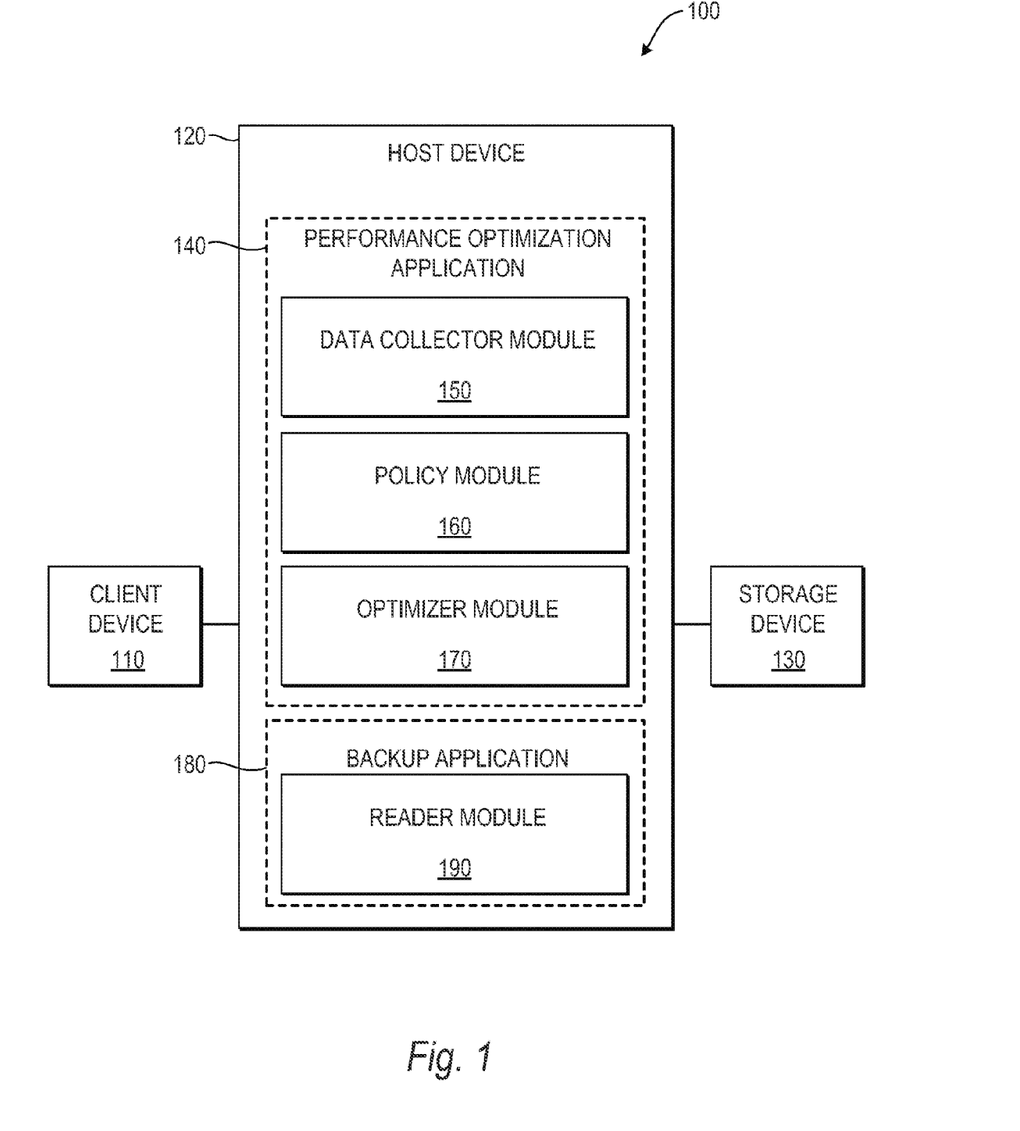
FIG. 1 is a block diagram of a system implementing dynamic I/O performance optimization in accordance with embodiments.

FIG. 1 is a block diagram of a system 100 implementing dynamic I/O performance optimization in accordance with embodiments. The system 100 comprises a client device 110, a host device 120, and a storage device 130.

The client device 110 may be, for example, a file server (e.g., a dedicated file server, a non-dedicated file server, a file transfer protocol (FTP) server, a hypertext transfer protocol (HTTP) server, etc.), a database server (e.g., an Oracle database, an IBM DB2 server, an IBM Informix database, an Ingres database, a SQL server, etc.), a virtual server/environment (e.g., VMware, Windows 2008 Hyper-V, Microsoft Virtual Server 2005, Citrix XenServer, HP Integrity Virtual Machines, etc.), a secondary memory, or another type of device (e.g., notebook, desktop, tablet, storage device, etc.). Information stored on client device 110 may be periodically or continuously backed up to storage device 130 via a backup application 180 and a performance optimization application 140 stored/running on the host device 120.

The host device 120 may be a server. For example, the host device 120 may be a media server, an administration server, a cell manager, and/or an application server. In embodiments, the host device 120 may comprise a performance optimization application 140 which includes a data collector module 150, a policy module 160, and an optimizer module 170. The host device 120 may further comprise a backup application 180 which includes, among other things, a reader module 190. The backup application may be an application or manager running/stored, at least in part, on the host device 120, and may protect the data and/or system state of a device (e.g., client device 110) by periodically or continuously storing the data on another device (e.g., storage device 130). The reader module 190 of the backup application 180 may be the portion of the backup application responsible for reading data from the client device 110 as part of the backup process. In some embodiments, functionality of the host device 120 may be distributed across a plurality of devices.

The host device 120 may comprise an interface for interfacing with the client device 110 and for interfacing with storage device 130 via, e.g., a storage area network (SAN) interface, a network-attached storage (NAS) interface, a small computer system interface (SCSI), a serial advanced technology attachment interface (SATA) and/or an integrated drive electronics (IDE) interface. The host device 120 may also communicate with the client device 110 and the storage device 130 via wired and/or wireless communication mechanisms including, but not limited to, Ethernet, local area network (LAN), wide area network (WAN), coaxial network, and/or fiber network.

The storage device 130 may include one or more of any type of storage device including, but not limited to, tape devices, disk arrays, optical storage, redundant array of independent disks (RAID) systems, and/or just a bunch of disks (JBOD).

By way of example, the host device 120 may be configured to cause a snapshot image of the client device 110 to be taken. The host device 120 may then read the snapshot image from the client device 110 using operating system (OS) read calls. This reading process may involve a buffered I/O process and/or an un-buffered I/O process. The data that is read via buffered I/O and/or un-buffered I/O may be subsequently written to the storage device 130, and therefore a backup of the client device 110 at a particular point in time may be formed. In the event the client device 110 fails, recovery may be effectuated via this backup.

More particularly, in embodiments, the data collector module 150, the policy module 160, the optimizer module 170, and the reader module 190 of the host device 120 may cooperate to dynamically select between buffered I/O and un-buffered I/O based on detected system conditions (e.g., file system type, memory utilization, CPU utilization, number of cache misses, I/O frequency, and I/O buffer size). This may result in enhanced read performance when compared to conventional systems that have static I/O settings (i.e., either buffered I/O or un-buffered I/O based on decisions at the system design phase of likely/potential customer scenarios).

In the buffered I/O process (also referred to as an asynchronous I/O process), data from the client device 110 is buffered in a file system buffer cache (not shown) during the read process. Use of a file system buffer cache minimizes the frequency of client device 110 access by the host device 120. In particular, when the host device 120 attempts to read the snapshot image from the client device 110, the host device 120 first attempts to read the requested data from the file system buffer cache. If the requested data is not already present in the file buffer cache, the host device 120 then proceeds read the data from the client device 110 and cache it to the file system buffer cache. The buffered I/O process can therefore be broken down into two categories: a file buffer cache hit and a file buffer cache miss.

In a file buffer cache hit, the host device 120 issues a read request. The requested data is found in the file buffer cache and the requested data is copied over to an application buffer on host device 120. In contrast, in a file buffer cache miss, the host device 120 issues a read request. The host device 120 looks for the requested data in the file buffer cache and determines that the requested data is not present in the file buffer cache. The host device 120 then proceeds to read the data from client device 110. The data from client device 110 is then cached in the file buffer cache and subsequently copied from the file buffer cache to the application buffer. File buffer cache misses, therefore, require more processes than file buffer cache hits in the buffered I/O process.

By contrast, in the un-buffered I/O process (also referred to as a synchronous I/O or direct I/O) a file buffer cache is not utilized, and data is transferred directly from the client device 110 to the application buffer. That is, the host device 120 issues a read request, the host device 120 initiates a client device 110 read, and the requested data is transferred from client device 110 to the application buffer.

Both buffered I/O and un-buffered I/O have advantages and disadvantages. For example, buffered I/O may benefit applications by minimizing the frequency of disk accesses because of the file buffer cache. This may improve response time and throughput. However, the use of a file buffer cache in buffered I/O results in overhead since data is first moved from the disk to the file buffer cache and from there to the application buffer. This "double-copying" of data results in additional CPU consumption. Also, large amounts of application data in the file buffer cache makes less memory available for the other applications. This results in additional system overhead (e.g., a large amount of page swaps) due to memory management. Moreover, some applications may manage data caching at the application level, so the application may not need the file system to implement this service.

Un-buffered I/O may benefit applications by reducing CPU consumption and eliminating overhead of copying data twice—first between the disk and the file buffer cache, and then from the file buffer cache to the application buffer. However, un-buffered I/O read causes synchronous reads from disk, unlike the buffered I/O policy where the reads may be satisfied from the file buffer cache. This may result in poor performance if the data is likely to be in the file buffer cache under the buffered I/O policy. Un-buffered I/O also bypasses file system read-ahead, which may provide significant performance boost for sequentially accessed files. When read-ahead is employed, the operating system may try to anticipate future need for pages of a sequential file by observing the pattern in which an application accesses the file. When the application accesses two successive pages of the file, the operating system may assume that the program will continue to access the file sequentially, and schedule additional sequential reads of the file. These reads are overlapped with application processing, and may make the data available to the application sooner than if the operating system waits for the program to access the next page before initiating the I/O.

Below is a table summarizing example potential advantages, example potential disadvantages, and an example potential favorable environments for both buffered I/O and un-buffered I/O:

|  | Buffered I/O | Un-Buffered I/O |
|---|---|---|
| I/O Process | Data from client device is buffered in the file buffer cache before being transferred to the application buffer. | Data from client device is transferred directly from client device to the application buffer. |
| Potential Advantages | The operating system may minimize the frequency of client device accesses by buffering data in main memory, within a structure called the file buffer cache. | Data is transferred directly from the client device to the application buffer, without the use of the file buffer cache. This may reduce one extra read and write in |

-continued

|   | Buffered I/O | Un-Buffered I/O |
|---|---|---|
|   |   | the file system cache and result in less CPU consumption. |
| Potential Disadvantages | Buffered I/O has additional overhead because data is first moved from the client to the file buffer cache, and from file buffer cache to the application buffer. This "double copying" of data may result in more CPU consumption and add overhead to the memory. | Applications have to wait for the read or write to complete. Response time and throughput may be poor due to slow disk access times. |
| Example Potential Favorable Environment | HFS file system type; low memory utilization; low CPU utilization; low cache misses; and/or small I/O buffer size. | VxFS File system type; high memory utilization; high CPU utilization; high cache misses; and/or large I/O buffer size. |

As discussed, in some instances, using a buffered I/O may result in optimized performance. In other instances, however, using an un-buffered I/O may result in optimized performance. The performance result is generally a function of a number of current system conditions/parameters including, but not limited to, the file system type, the memory utilization, the CPU utilization, the number of cache misses over a time period, the I/O buffer size, etc. Embodiments disclosed herein optimize system performance by dynamically deciding between buffered I/O and un-buffered I/O based on these conditions/parameters. More specifically, and as discussed in greater detail below, the data collector module 150, the policy module 160, the optimizer module 170, and the reader module 190 of a host device 120 or host system collaborate to enable dynamic selection between buffered I/O and un-buffered I/O for one or more read calls based on detected system conditions/parameters. In addition, and as discussed in greater detail below, the data collector module 150, the policy module 160, the optimizer module 170, and the reader module 190 may further cooperate to optimize other conditions related to the I/O selection such as read alignment, dynamic threading, and/or buffer tuning.

In embodiments, the data collector module 150 is configured to collect/detect conditions, parameters, and/or status information related to the host device 120. For example, the data collector module 150 may determine the host device 120 file system type(s). This may be the file system type(s) where the backup application 180 is working. Examples include a hierarchical file system (HFS), a Veritas file system (VxFS), a journaled file system (JFS), and an online JFS. The data collector module 150 may further determine the used/unused host file system capacity (e.g., 4 GB used in 6 GB VxFS), the host database volume size (e.g., database volume of 2 GB), the host memory utilization (e.g., 70% memory utilization), the host CPU utilization (e.g., 80% CPU utilization), the number or percentage of cache misses of a period of time (e.g., 55% cache misses), the frequency of host I/O or read/writes for a period of time, and/or I/O buffer size of the file system.

The data collector module 150 may determine these values once. Alternatively or in addition, the data collector module 150 may determine the values periodically or randomly (e.g., based on the number of read operations for that instance of probing). For example, the data collector module 150 may determine the file system type once, and determine memory and CPU utilization randomly or periodically. Furthermore, the determined values may be current values, recent values, prior values, values over a period of time, and/or initialized values.

In embodiments, the data collector module 150 may run a memory analyzer, profiler, and/or other dynamic system analysis tool (e.g., GProf, ATOM, etc.) to determine, collect, interpret, and/or measure the above-mentioned parameters. For example, the data collector module 150 may run a dynamic program analysis tool to determine the memory utilization and CPU utilization. Alternatively or in addition, the data collector module 150 may run an application or subroutine to determine, collect, interpret, and/or measure the above-mentioned parameters.

After the data collector module 150 collects the above-mentioned information, the data collector module 150 may send the information to the policy module 160. In embodiments, the data collector module 150 may send the information continuously, periodically, after a value is determined for each parameter, and/or whenever backup is triggered. The policy module 150 may receive this information via various mechanisms, such as, for example, via an inter-process communication (IPC) mechanism. The policy module 160 may then update a policy table based on the received information. As used herein, the policy table may refer to a data structure generated by the policy module whose schema may be generally designed as per the parameter/value pair set forth in the table in FIG. 2.

Figure 2:
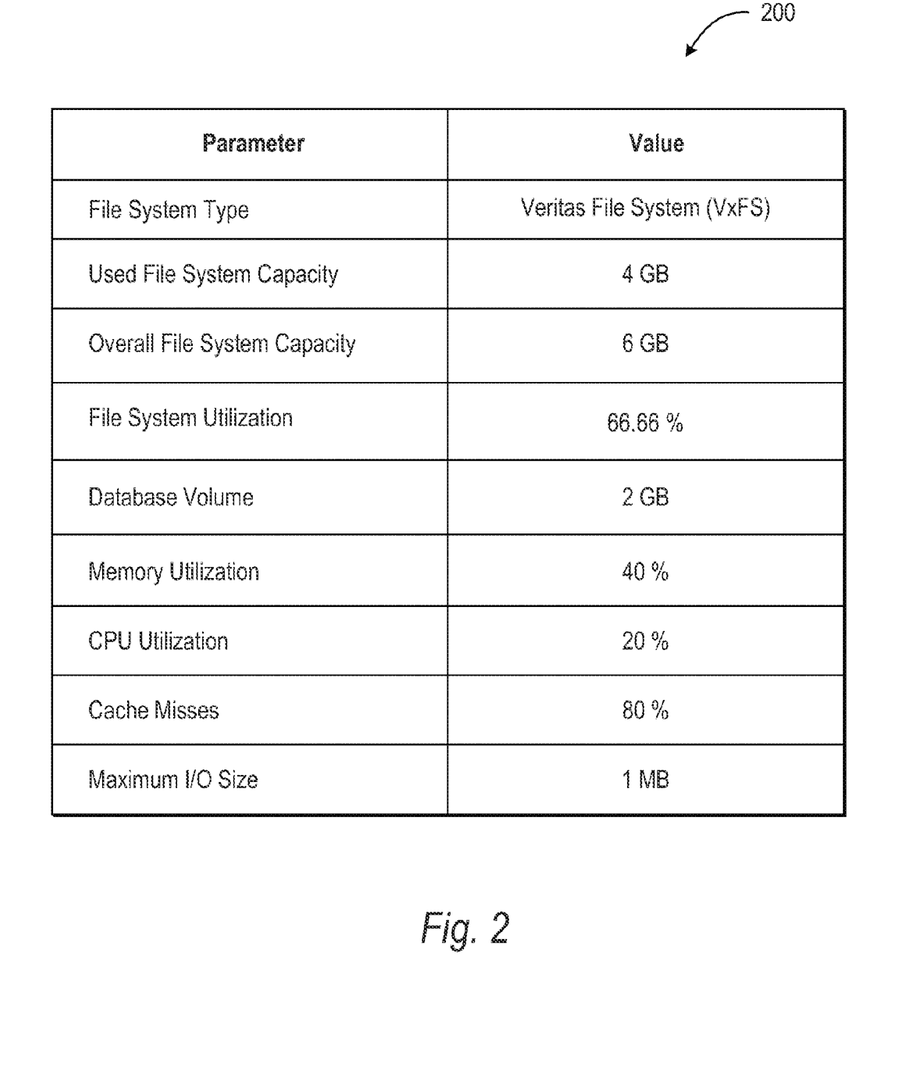
FIG. 2 is an example policy table in accordance with embodiments.

FIG. 2 provides an example policy table 200 in accordance with embodiments. It should be understood that FIG. 2 is merely an example, and the policy table may be organized in a different manner, as well as include different content in accordance with various embodiments. As shown, the policy table 200 may comprise parameters such as the file system type, used file system capacity, overall file system capacity, file system utilization, database volume, memory utilization, CPU utilization, number of cache misses, host I/O frequency, and/or maximum I/O size. For each parameter, values may be included based at least in part of the information collected by the data collector module. Some of these values may be determined based on calculations conducted on raw information collected by the data collector module 150 (e.g., file system utilization may be determined by dividing the used file system capacity by the overall file system capacity). Furthermore, previous iterations of the policy table may be used to calculate values of the current policy table (e.g., the number or cache misses for a time period may be determined based upon reference to previous iterations of the policy table).

In addition to parameters and values, the policy table may include administrative data. For example, the policy table may include reference information such as the date and time of the most recent update. Further, the policy table may include information indicating which values have changed since a previous iteration of the policy table.

The optimizer module 170 may continuously or periodically receive a policy table feed from the policy module 160. This policy feed may comprise all or a portion of the policy table 200. The optimizer module 170 may then determine a preferred buffered I/O technique (i.e., buffered I/O or un-buffered I/O) for a given instance based on analysis of the policy table. More specifically, the optimizer module 170 may analyze the previous and/or current detected status of the host device 120 as described in the policy table and determine if buffered I/O or un-buffered I/O would result in optimum read performance. The optimizer module 170 may then, based on this analysis, store a recommended I/O technique within the policy table. Of course, the optimizer module 170 may determine that one particular I/O technique is better for a particular point in time, and then change to the other I/O technique based on changed circumstances at a later point in time. Such flexibility enables the host device 120 to react to changing circumstances and implement the I/O policy that appears most efficient for a particular set of conditions.

In order to decide between buffered I/O and un-buffered I/O, the optimizer module 170 may analyze current and/or prior values in the policy table and compare the values with a rule-set to determine a preferred I/O policy. In embodiments, this rule set may have a rule that leads to an immediate conclusion. For example, only certain types of file systems may support un-buffered I/O (e.g., VxFS). In the event that the policy table lists a file system that does not support un-buffered I/O, the type of I/O technique cannot be changed, and therefore the optimizer module 170 determines based on the rule set that only the buffered I/O technique is possible and analysis of the other parameters is not necessary. For example, the rule set may state: If HFS, then buffered I/O. Therefore, if the policy table lists HFS, then the optimizer module 170 concludes buffered I/O. The optimizer module 170 then instructs the reader module 190 to use that particular I/O technique for one or more read calls. That is, the optimizer module 170 may intercept the reader module 190 (i.e., the reader module of backup application 180) and set the type of I/O (buffered or un-buffered) for that instance. Based on this setting, the reader module 190 may proceed the conduct the read based on the specified policy.

In the event that the file system type is compatible with buffered I/O and un-buffered I/O, the optimizer modules 170 may make an I/O technique decision based on consideration of multiple parameters in the policy table and multiple rules in the rule-set. For example, the rule set may lead the optimizer module 170 to select buffered I/O in situations where I/O on the database volume is not buffered by a database application, memory utilization is less than 60%, CPU utilization is less than 50%, cache misses is less than 15%, host I/O frequency is less than 40%, and/or maximum I/O size is less than 256 KB. In contrast, the rule set may lead the optimizer module 170 to select un-buffered I/O in situations where, e.g., I/O on database volume is buffered by the database application, memory utilization is more than 80%, CPU utilization is more than 70%, cache misses is more than 50%, and/or I/O buffer size is more than 512 KB.

The tables provided below show examples of situations that may lead to the optimizer module 170, based on the rule set, to conclude buffered I/O or un-buffered I/O. Of course, these are merely examples and should not be seen as limiting because rule sets may vary depending on preferences, environments, and/or situations. Further, parameters/values may be weighted differently in various embodiments.

| Parameter | Value |
| --- | --- |
| File System Type | VxFS |
| Memory Utilization | 40% |
| CPU Utilization | 30% |
| Cache Misses | 10% |
| Host I/O Frequency | 60% |
| I/O Buffer Size | 256 KB |
| Recommended I/O Policy | Buffered I/O |

| Parameter | Value |
| --- | --- |
| File System Type | VxFS |
| Memory Utilization | 85% |
| CPU Utilization | 80% |
| Cache Misses | 50% |
| Host I/O Frequency | 25% |
| I/O Buffer Size | 1 MB |
| Recommended I/O Policy | Un-Buffered I/O |

In addition to determining an I/O policy, in embodiments, the optimizer module 170 in cooperation with the reader module 190 may go a step further and execute various optimization processes for a given policy. Such optimization processes may include read alignment of data as per file system block size (for un-buffered I/O selections), dynamic threading of I/O calls (for un-buffered and buffered I/O selections), and/or buffer tuning (for buffered I/O selections).

As described above, the data collector module 150, the policy module 160, and the optimizer module 170 may be part of a performance optimization application 140. This performance optimization application 140 may be plug-in software to the backup application 180 comprising the reader module 190. As a plug-in, the data collector module 150, the policy module 160, and/or the optimizer module 170 may add specific abilities to the backup application 180.

Alternatively, the data collector module 150, the policy module 160, and the optimizer module 170 may be part of a software development kit (SDK) to the backup application 180. This SDK may be a set of development tools that allows for creation of application for the backup application 180. The SDK may be, e.g., an application programming interface (API) in the form of files to interface to a particular programming language and/or include hardware to communicate with embedded systems. In embodiments, the SDK may be downloadable via the Internet.

Still further, the data collector module 150, the policy module 160, and the optimizer module 170 may form part of the backup application 180, along with the reader module 190, or be part of an independent application. In some embodiments, the data collector module 150, the policy module 160, the optimizer module 170, the backup application 180, and/or the reader module 190 may be distributed across a plurality of devices.

Figure 3:
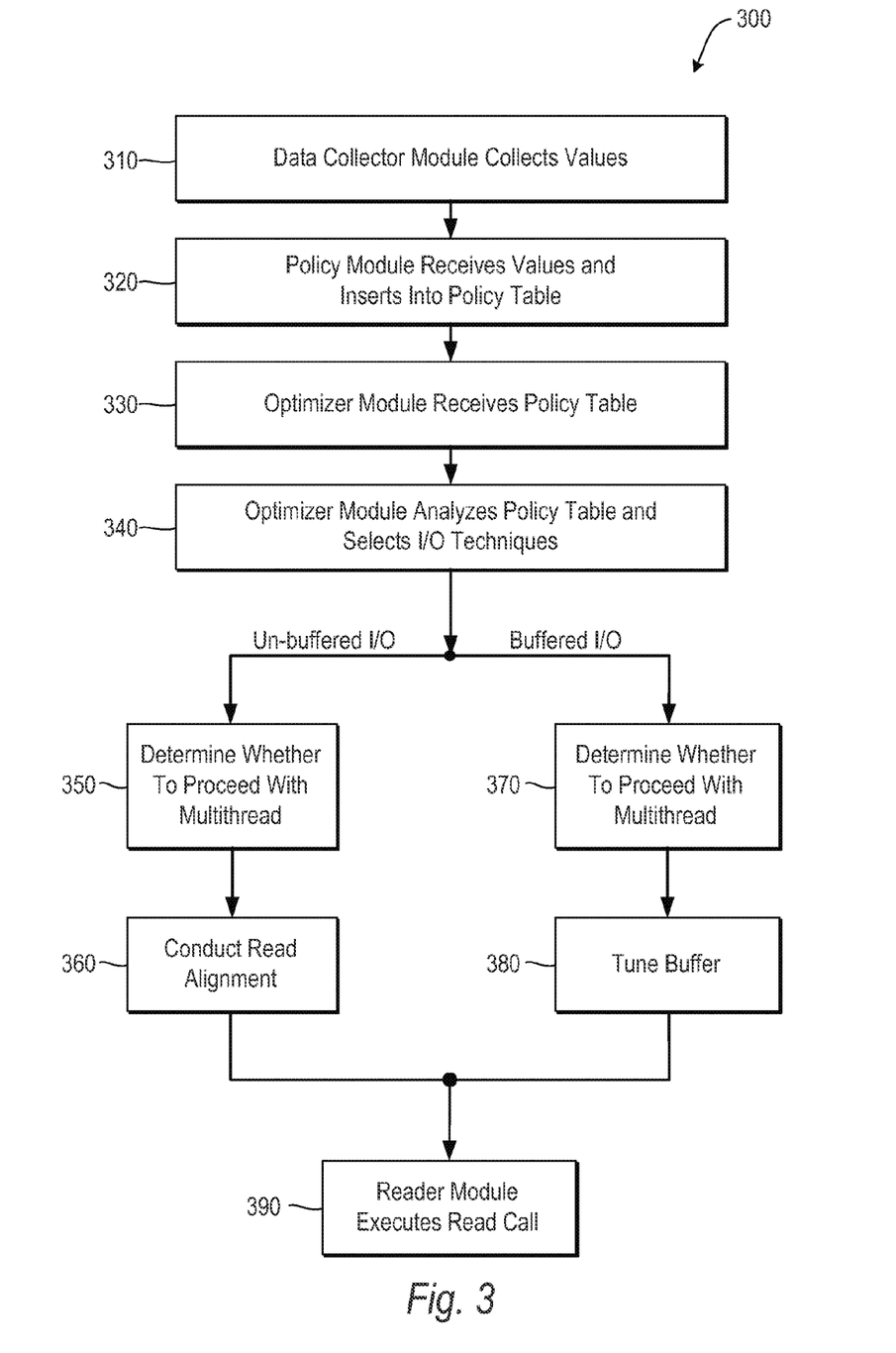
FIG. 3 is a process flow diagram of a method for dynamic I/O performance optimization in accordance with embodiments.

FIG. 3 is a process flow diagram of a method 300 for dynamic I/O performance optimization in accordance with embodiments. The method may be performed by the host device 120 shown in FIG. 1 or by a plurality of devices in accordance with embodiments.

The method may begin at block 310, wherein the data collector module 150 collects values for various parameters. The types of parameters (e.g., file system type, used file system capacity, overall file system capacity, database volume, memory utilization, CPU utilization, number of cache misses, host I/O frequency, and/or host I/O buffer size) may be set by the optimizer module 170. The data collector module 150 may determine these values once, periodically, randomly, or based on a trigger (e.g., the start of a backup process). Further, the data collector module 150 may determine these values by running a memory analyzer, profiler, and/or other dynamic program analysis tool, or by running a custom subroutine or tool.

At block 320, the policy module 160 receives the collected values from the data collector module 150 and inserts the values in a policy table. The policy table may refer to a data structure generated by the policy module whose schema may be generally designed as per the parameter/value pair set forth in the table in FIG. 2.

At block 330, the optimizer module 170 may receive all or a portion of the policy table from the policy module 160. At block 440, the policy module analyzes the contents of the policy table and selects an I/O technique. As mentioned above, in embodiments, this process may comprise evaluating the current and/or prior values in the policy table against a predetermined or predeterminable rule-set. The rule set may comprise a plurality of rules that lead to a selection of either buffered I/O or un-buffered I/O based on different input parameters.

If un-buffered I/O is selected, at block 350, the optimizer module 170 determines whether or not to proceed with multithread for I/O calls. The multithread process may involve multiplexing data streams into parallel kernel threads using, e.g., Pthread Portable Operating System Interface for Unix (POSIX) standard system calls. Furthermore, the decision of whether or not to proceed with multithreading may be based on the amount of free CPU cycles. For example, multithreading may be used if the amount of free CPU cycles is more than 40%.

Furthermore, if un-buffered I/O is selected, at block 360, the optimizer module 170 conducts read alignment of data as per file system block size. This process may involve determining the read size as a multiple of the file system block size.

If buffered I/O is selected, at block 370, the optimizer module 170 similarly determines whether or not to proceed with multithread for I/O calls. As described above with reference to block 350, the multithread process may involve multiplexing data streams into parallel kernel threads using, e.g., Pthread POSIX standard system calls. Furthermore, the decision of whether or not to proceed with multithreading may be based on the amount of free CPU cycles. For example, multithreading may be used if the amount of free CPU cycles is more than 40%.

The optimizer further conducts buffer tuning at block 380. This process may comprise calculating an optimum buffer size for a read depending on the amount of data to be read. If the data to be read is a small number of large files, the buffer size may be set larger. Conversely, if the data to be read is a large number of small size files, the buffer size may be set smaller.

At block 390, the reader module 190 of the backup application 180 executes the read call based on the decisions made in the above-mentioned processes.

Figure 4:
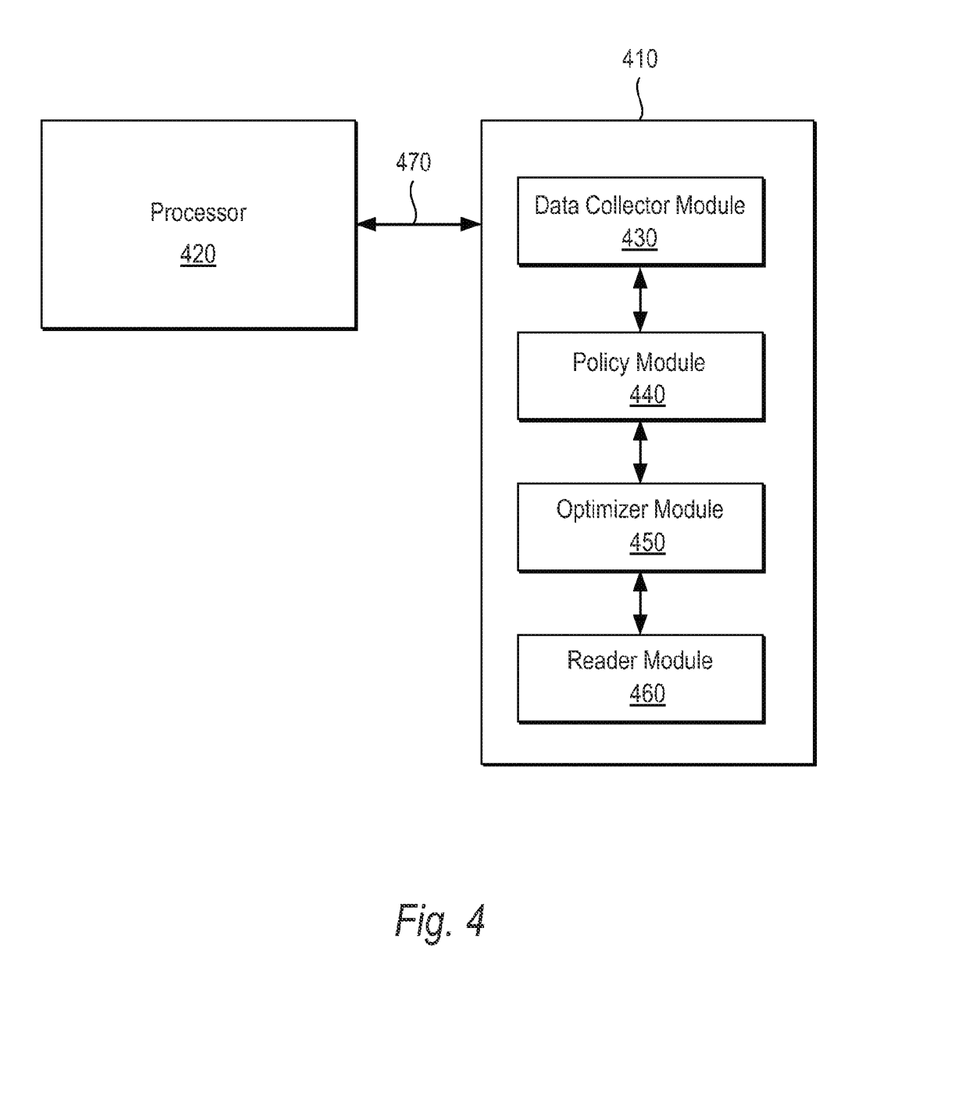
FIG. 4 is a block diagram showing a processor-readable medium that stores processor-executable instructions for dynamic I/O performance optimizer in accordance with embodiments.

FIG. 4 is a block diagram showing a processor-readable medium having processor-executable instructions stored thereon that, when executed, cause a processor to conduct dynamic I/O performance optimization in accordance with embodiments. The processor-readable medium is generally referred to by reference number 410 and may be included in the host device 120 described in relation to FIG. 1 or distributed across a plurality of devices. The processor-readable medium 410 may correspond to any typical storage device that stores instructions, codes, data, and/or other information. As used herein, a processor-readable medium 410 is any medium that stores instructions, codes, data, or other information non-transitorily and is directly or indirectly accessible to a processor 420. Said differently, a processor-readable medium 410 is a non-transitory medium at which a processor 420 can access instructions, codes, data, or other information. For example, the processor-readable medium 410 can be a volatile random access memory (RAM), a persistent data store such as a hard disk drive or a solid-state drive, a compact disc (CD), a digital video disc (DVD), a Secure Digital™ (SD) card, a MultiMediaCard (MMC) card, a Compact-Flash™ (CF) card, or a combination thereof or other memories. In some implementations, the processor-readable medium 410 can be integrated with processor 420, separate from processor 420, or external to the host device 120. Furthermore, in some implementations, the processor-readable medium 410 includes two or more different processor-readable media.

The processor 420 generally retrieves and executes the instructions stored in the processor-readable medium 410 to conduct dynamic I/O performance optimization in accordance with embodiments. In an embodiment, the processor-readable medium 410 can be accessed by the processor 420 over a bus 470.

A first region 430 of the processor-readable medium 410 may include data collector module functionality as described herein. Below is example pseudo-code for operations of the data collector module 150 in accordance with embodiments:
 Step1: START;
 Step2: Get collection mode;
 Step3: If one time collection then go to Step10 else got to step50;
 Step10: Get file system type;
 Step11: Get maximum I/O size;
 Step12: Go to Step100;
 Step50: Get file system buffer space related information;
 Step51: Get current memory utilization;
 Step52: Get current CPU utilization;
 Step53: Get current average cache misses;
 Step54: Get current I/O frequency;
 Step100: END.

A second region 440 of the processor-readable medium 410 may include policy module functionality as described herein. Below is example pseudo-code for operations of the policy module 160 in accordance with embodiments:
 Step1: START;
 Step2: Validate each input value;
 Step3: If value is file system type then update policy table with the value;
 Step4: If value is cache misses calculate average with existing value and store into the table;
 Step5: Process other values accordingly and store;
 Step6: END.

A third region 450 of the processor-readable medium 410 may include optimizer module functionality as described herein. Below is example pseudo-code for operations of the optimizer module 170 in accordance with embodiments:
 Step1: START;
 Step2: Set Un-buffer I/O flag to FLASE and buffered I/O flag to TRUE;
 Step3: If file system doesn't support un-buffered I/O then go to Step200;
 Step4: If Maximum I/O size is less than 1 MB then go to Step200 else go to Step100;
 Step4: If Maximum I/O size is greater than 1 MB and cache miss is less the 10% then go to Step200;
 Step100: Set Un-buffer I/O flag to TRUE and buffered I/O flag to FALSE;
 Step101: Set create thread flag to TRUE;
 Step200: END.

A fourth region 460 of the processor-readable medium 410 may include reader module functionality as described herein.

Although shown as contiguous blocks, the software components can be stored in any order or configuration. For example, if the processor-readable medium 410 is a hard drive, the software components can be stored in non-contiguous, or even overlapping, sectors.

What is claimed is:

1. A method for backup optimization, the method comprising:
    collecting, by a data collector module of a host device, values for a plurality of device parameters;
    receiving, by a policy module of the host device, values for the plurality of device parameters;
    updating, by the policy module of the host device, a policy table with the values for the plurality of device parameters;
    receiving, by an optimizer module of a host device, the policy table;
    determining, by the optimizer module of the host device, whether to proceed with buffered input/output or un-buffered input/output for a read call based at least in part on the policy table; and
    instructing, by the optimizer module of the host device, a read module of a backup application to proceed with either buffered input/output or un-buffered input/output for the read call.

2. The method of claim 1, wherein the plurality of device parameters comprise file system type, central processing unit utilization, memory utilization, and number or percentage of cache misses.

3. The method of claim 1, wherein determining whether to proceed with buffered input/output or un-buffered input/output comprises evaluating the policy table in view of a rule set.

4. The method of claim 1, further comprising conducting read alignment based on file system block size if the optimizer module determines to proceed with un-buffered input/output.

5. The method of claim 1, further comprising conducting buffer tuning if the optimizer module determines to proceed with buffered input/output.

6. The method of claim 1, wherein the optimizer module instructs the reader module to proceed with buffered input/output for the read call if the policy table indicates that a file system type is a hierarchical file system.

7. The method of claim 1, wherein buffered input/output comprises reading data from a client into a file buffer cache before being transferred the data to an application buffer, and wherein un-buffered input/output comprises reading data directly from a client to an application buffer.

8. A processor-readable storage medium having processor-executable instructions stored thereon that, when executed, cause a processor to:
    collect values for a plurality of device parameters;
    update a policy table with the values for the plurality of device parameters;
    determine, based at least in part on the policy table, whether to proceed with buffered input/output or un-buffered input/output for a read call; and
    send an instruction to proceed with either buffered input/output or un-buffered input/output for the read call.

9. The processor-readable storage medium of claim 8, wherein the instruction is sent to a reader module of a backup application.

10. The processor-readable storage medium of claim 8, wherein determining whether to proceed with buffered input/output or un-buffered input/output comprises evaluating the values in the policy table in view of a rule set.

11. The processor-readable storage medium of claim 8, comprising further processor-executable instructions that, when executed, cause the processor to conduct read alignment based on file system block size.

12. The processor-readable storage medium of claim 8, comprising further processor-executable instructions that, when executed, cause the processor to update the policy table with a recommended input/output technique based on the current and prior values in the policy table.

13. The processor-readable storage medium of claim 8, wherein buffered input/output comprises reading data from a client into a file buffer cache before being transferred the data to an application buffer, and wherein un-buffered input/output comprises reading data directly from a client to an application buffer.

14. A system comprising:
    one or more memories; and
    one or more processors communicatively coupled to the one or more memories, wherein the one or more memories store instructions that when executed by the one or more processors implement operations comprising
        collecting values for a plurality of device parameters;
        receiving the values for the plurality of device parameters and updating a policy table;
        determining, based on the policy table, whether to proceed with buffered input/output or un-buffered input/output for a read call; and
        providing instructing to proceed with either buffered input/output or un-buffered input/output for the read call.

15. The system of claim 14, wherein the instructions, when executed, determine whether to proceed with buffered input/output or un-buffered input/output for the read call by evaluating the policy table in view of a rule set.

* * * * *